United States Patent [19]

Taft

[11] 4,392,780
[45] Jul. 12, 1983

[54] WIND POWERING OF TURBINE HAVING VARIABLE PITCH VANES

[76] Inventor: John R. Taft, 27 Mouton Rd., Duxbury, Mass. 02332

[21] Appl. No.: 895,355

[22] Filed: Apr. 11, 1978

[51] Int. Cl.³ .............................................. F03D 3/00
[52] U.S. Cl. ........................................ 416/17; 416/108; 416/119; 416/132 B
[58] Field of Search ............ 416/17, 117, 118, 197 A, 416/122, 108, 109, 111, 132 B, 112, 116, 119, 240 A

[56] References Cited

U.S. PATENT DOCUMENTS

| | | | |
|---|---|---|---|
| 61,530 | 1/1867 | Fowler | 416/17 X |
| 224,467 | 2/1880 | Nevers | 416/17 |
| 410,361 | 9/1889 | Harbaugh | 416/108 X |
| 846,532 | 3/1907 | Viskochil | 416/118 |
| 1,126,069 | 1/1915 | Palmer | 416/17 |
| 1,139,103 | 5/1915 | Clade | 416/119 |
| 1,516,668 | 11/1924 | Burch | 416/117 |
| 2,171,732 | 9/1939 | Michaelson et al. | 416/119 X |
| 2,319,286 | 5/1943 | Andresen | 416/132 B X |

FOREIGN PATENT DOCUMENTS

| | | | |
|---|---|---|---|
| Ad.23629 | 12/1921 | France | 416/117 |
| 547641 | 12/1922 | France | 416/17 |
| 2289764 | 5/1976 | France | 416/17 |
| 2291379 | 6/1976 | France | 416/DIG. 6 |
| 5164 | of 1909 | United Kingdom | 416/17 |

*Primary Examiner*—Everette A. Powell, Jr.
*Attorney, Agent, or Firm*—Charles Hieken, Esq.

[57] ABSTRACT

A vertical rotatable shaft is fitted with sets of radial arms extending from it to which are connected the leading edges of vanes rotatable about that member as axis. The vanes have sheets of flexbile material so that they may act like sails under pressure of the wind. A cam track, machined in a horizontal surface of a planar member just adjacent and outside the path of the vanes, guides the trailing edges of the vanes so that as the shaft rotates, the vanes are oriented about their axes to reach, run and tack before the wind. The member having the surface defining the cam track is attached to a tail assembly that orients the cam track to the wind direction. The inner assembly, which is pinned to the shaft makes a power rotor. The outer assembly which is free to rotate independently of the shaft is a cam cage.

8 Claims, 4 Drawing Figures

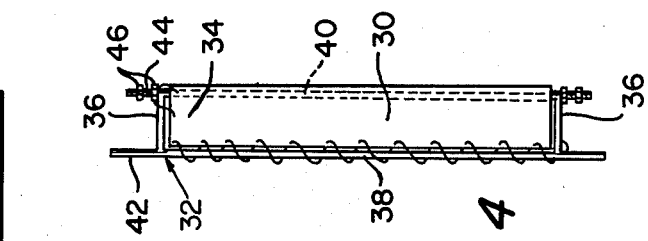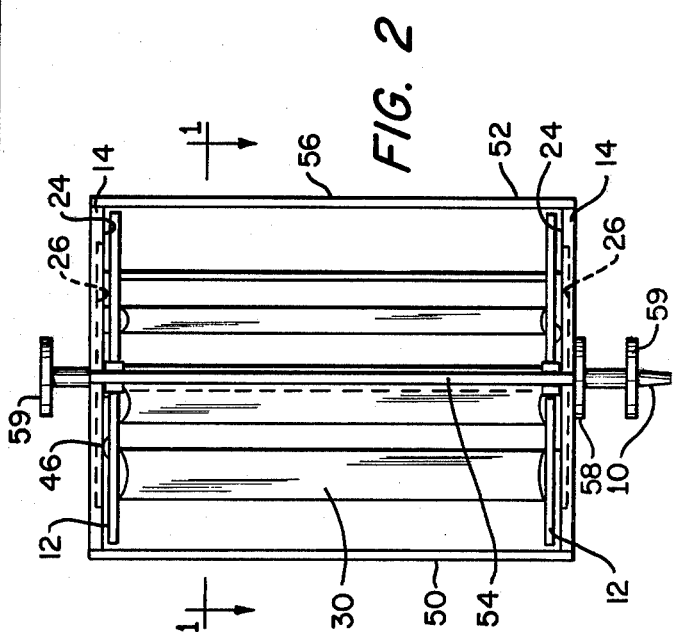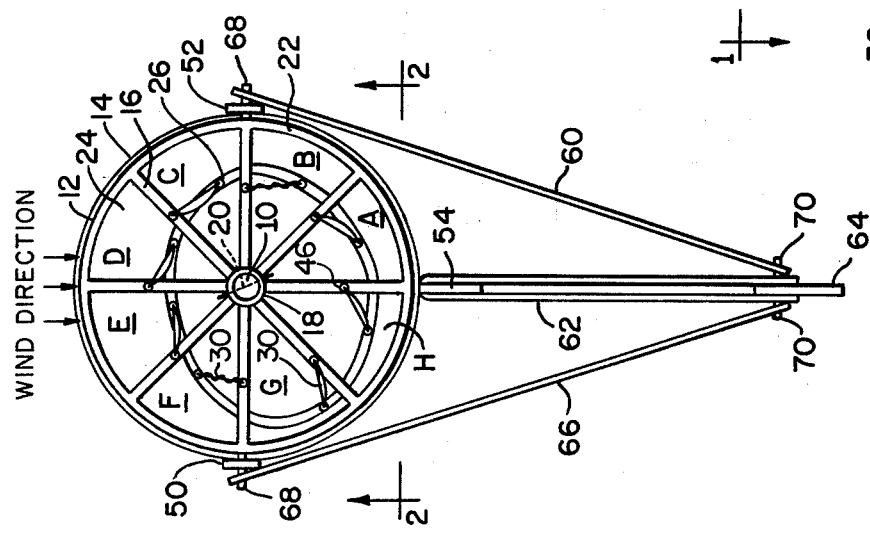

WIND POWERING OF TURBINE HAVING VARIABLE PITCH VANES

BACKGROUND OF THE INVENTION

The present invention relates generally to turbines including windturbines, which are commonly called "windmills" in prior patent documents, and relates more particularly to turbines such as windmills with variable pitch vanes.

If the axis of a wind powered turbine, or windmill, is not parallel to the direction of the wind but is perpendicular to it, the vanes rotating about the axis move into the wind and then away from it. So that the forces acting on the vanes, caused by the wind, do not counteract each other, variable pitch vanes have been devised. They allow the wind to act on a large area of the vane when the wind force is in the direction of rotation, and reduce the area of the vane effectively acted on by the wind when the wind force would be opposite the direction of rotation. The torque forces created by such devices are unfortunately uneven and the machines consequently cumbersome and inefficient. Examples of such devices are shown in U.S. Pat. Nos.

177,057—5/9/1876
250,806—12/13/1881
862,299—8/6/07
993,120—5/23/11
1,154,930—9/28/15
1,249,206—12/4/17
3,093,194—6/11/63

Accordingly, it is an important purpose or object of this invention to provide a turbine such as a windmill with characteristics superior to other variable pitch windmills. It is an object to provide a fluid turbine such as a windmill with more uniform and more effective torque, one that develops less vibration and more power for a given size.

SUMMARY OF THE INVENTION

The invention comprises a shaft, vanes (or foils) connected to the shaft so that they may rotate with the shaft about its axis, the vanes furthermore being rotatable about axes of their own parallel to the shaft axis. Each vane has a flexible sheet adapted to form a curved surface under wind pressure. Camming means are included to control the orientation of the vanes about their axes so that as the shaft and vanes rotate about the shaft axis, the vanes go through reaching, running and tacking modes.

In preferred embodiments of the invention the camming means is independently rotatable about the shaft axis and has a tail means responsive to wind direction to orient it to wind direction. Also the vanes have rectangular open frames with long and short members, the long members being parallel to the shaft axis, and the flexible sheet is mounted on the frame formed. The camming means is also a substantially planar surface, the surface being just adjacent and parallel to the short members of the vanes. The camming means is rotably mounted on the shaft, the surface forming a cam channel adapted to guide projecting members of the vanes to orient the vanes about their axes.

BRIEF DESCRIPTION OF THE DRAWING

FIG. 1 is a plan view of a vertical axis windmill which embodies features of the invention, taken along line 1—1 of FIG. 2;

FIG. 2 is an elevation view of the windmill taken along line 2—2 of FIG. 1;

FIG. 3 is an elevation view of the cam cage of the windmill, showing the tail assembly; and FIG. 4 is an elevation view of a vane assembly of the windmill.

DETAILED DESCRIPTION OF PREFERRED EMBODIMENTS

Referring to FIG. 1 of the drawing, there is shown a vertical rotatable power rotor shaft 10, the bottom one of two rotor wheels 12 and the bottom one of two cam discs 14. The rotor wheel, 12, is shown with eight spokes, 16, of equal length, radiating symmetrically from a collar 18 to which they are fixed. More or fewer spokes may be fitted, and consequently more or fewer vanes. The collar 18 is pinned to shaft 10 by pin 20 and hence rotates with it. The spokes 16 are joined at their outer edges by a rim 22, for strength and stability. Thus the rotor wheel 12, whose principal elements are spokes 16, is fixed to shaft 10 and rotatable therewith.

The bottom cam disc 14 shown in FIG. 1 is also mounted on shaft 10, but is not keyed to it and is rotatable with respect to the shaft 10. The cam disc, 14, has machined in its surface, 24, a cam channel, or guide, 26, of the configuration shown.

Vane assemblies 30 are shown in FIG. 1 in cross section. In FIG. 4, the elements of the vane assemblies 30 can be seen more clearly. A vane assembly 30 is made of essentially a rectangular frame 32 to which is lashed a sheet 34 of material. The material is some flexible material, such as nylon, used for sails. The sheet 34 is fitted loosely on frame 32, so that it will provide a designed aerodynamic section, like a sail does, under pressure of the wind.

The rectangular frame 32 of the vane assembly 30 has two horizontal short rods 36 joined to two vertical long rods 38 and 40. Each of the vertical long rods 38 and 40 extend beyond their intersection with short rods 36, creating end portions 42 and 44, respectively.

Referring now to FIG. 2, it can be seen that there are top and bottom rotor wheels 12. With the aid of FIG. 4 also, it can be seen how vane assemblies 30 are part of the overall apparatus. The end portions 44 of vertical rods 40 of the vane rectangular frames 32 extend through holes in the spokes 16, and have nuts 46 at the end of the end portions 44, maintaining the vertical positioning of the vane assemblies 30. The assemblies 30 are rotatable about the axes of the vertical rods 40.

Referring to FIG. 2, it can be seen that there are top and bottom cam discs 14, fixed to strut 50 and strut 52, and to a third vertical member 54. The cam discs 14 are thus held together in a fixed relationship. In this relationship, the cam channels 26 face each other and coincide. In effect a cam cage 56 is thus formed, just surrounding the cylindrical volume formed by the rotor wheels 12 and vane assemblies 30. The cam cage 56 is mounted on shaft via holes in cam discs and is rotatable about shaft 10. It is held in the appropriate vertical position by a thrust bearing 58, which is carried against a shoulder of support bushing 59. A similar bushing may be fitted at the upper end of shaft 10, to be attached by guy wires or struts to external structure to steady the assembly.

The power rotor is held in its appropriate vertical position by use of a tapered shaft fitted into one half of a coupling. The other half of the coupling is mated to a driven device (not shown) such as an electric generator, which is rigidly mounted and fitted with thrust bearings selected to carry the weight of the power rotor as well as any thrust inherent in the driven machine.

Returning to a consideration of the vane assemblies 30, it can be seen that the end portions 42 of the other vertical rods 38 of the frames 32 extend through the plane of the rotor wheels 12 into the cam channels 26 of the cam discs 14. As FIG. 1 indicates, the orientation of a vane assembly 30 about the axis of vertical rod 40 will be determined by the position of vertical rod 38, as guided by cam channel 26.

Finally, reference to FIGS. 1 and 3 will show a tail assembly 60 attached to the cam cage 56. Tail assembly 60 is comprised of structural members 62 extending from a joint with vertical member 54 and extending to support a tail surface 64. Tail 64, structural members 62 and vertical member 54 are all rigidly joined together.

Tail guys 66, of rope or cable, are connected to fastening projections 68 on struts 50 and 52, and from there connected to fastening projections 70 on structural members 62, to steady the tail assembly 60.

The operation of this vertical axis windmill may best be explained by first turning to FIG. 1.

The flexible sheet 34 of each vane assembly 30, under pressure of the wind, acts like a sail. It will form a curved area on either side of the vane frame 32, depending on the direction of the wind. That curve shape (see FIG. 1) is essentially the same through the vertical length of the vane assembly 30.

In FIG. 1, the wind, in the direction shown, has generally oriented the cam cage 56 by virtue of the action of the wind on the tail assembly 60 fixed to it. Because the tail assembly is fixed to the cam cage 56 in a predetermined fashion, the orientation of the tail assembly 60 orients the cam discs 14 and the coincident cam channels 26 to the wind also.

The cam channels 26 are cut to form a guide to the extended end portions 42 of vane vertical rods 38 so that when the cam channels 26 are oriented to the wind direction by tail assembly 60, each vane assembly 30 will be approximately oriented around the axis of the other vane vertical rod 40 for the direction of wind it faces as the vane assemblies 30 rotate with vertical power shaft 10 about its axis.

Using the letters A, B, C, etc. to designate the positions of the different vane assemblies 30 as shown in FIG. 1, it can be seen that near position A, a vane is beating up wind; at B, in the vicinity of strut 52, a vane 30 is tacking; at C, a vane 30 is beating up wind; at D and E, vanes 30 are reaching across the wind, up wind at D and down wind at E; at F an intentional jibe is being performed by a vane 30; at G vane 30 is running before the wind, and at H it is reaching.

It is important to note that vanes 30 moving into the wind are developing useful torque based on familiar sailing principles. Wind pressure on the curved surface of sheets 34 of the vanes 30 in that position creates forces with components in the direction of rotation. Moreover, the curved surface of the sheet 34 also causes it to develop aerodynamic behavior—creating a forward suction or lift effect acting on the outside (convex) side of the sheet.

Furthermore, the cam discs 14 in the embodiment, it should be pointed out, act as covers at the ends of the cylindrical volume defined by the rotating vanes 30, preventing wind spillage off the ends of the vane sheets 34, and maximizing the performance of the turbine.

Finally, the impulses given the cam discs 14 from the jibe mode of vanes in position F serve to help position the cam disc 14 for the apparent wind (the combination of real wind and the result of the motion of the vane assemblies) rather than the real wind alone, further maximizing the performance of the turbine.

There has been described a novel turbine apparatus. It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus herein disclosed and limited solely by the spirit and scope of the appended claims.

What is claimed is:

1. A windmill apparatus comprising,
    a shaft rotatable about its axis,
    vanes connected to said shaft and rotatable therewith,
    each said vane being rotatable about a vane axis parallel to said shaft axis,
    each said vane including a flexible sheet adapted to form a curved surface under wind pressure,
    and camming means adapted to control the orientation of said vanes about said vane axes that is related only to the position of a respective vane about said shaft as said vanes rotate about said shaft axis, for orienting said vanes to go through reaching, running, beating, jibing and tacking modes,
    whereby said camming means receives impulses from the jibe mode of said vanes to help position said camming means for the apparent wind acting on said vanes.

2. The apparatus of claim 1 in which said camming means is rotatable about said shaft axis and includes a tail means responsive to wind direction, said tail means being adapted to orient said camming means to wind direction.

3. The apparatus of claim 1 in which each said vane includes an open frame, said flexible sheet being mounted in said frame.

4. The apparatus of claim 3 in which said frame is rectangular, with short and long edges, said long edges being parallel to said shaft axis.

5. The apparatus of claim 4 in which said camming means includes a member having a surface forming a cam guide, said member being rotatable about said shaft axis, said camming means further including a tail means responsive to wind direction, said tail means being adapted to orient said camming means to wind direction.

6. The apparatus of claim 5 in which said surface of said camming means member is substantially planar and perpendicular to said shaft axis, said vane axes and adjacent and parallel to said short edges of said vanes and comprises cover means at the end of the cylindrical volume defined by the rotating vanes for preventing wind spillage off the adjacent edges of the vane sheets.

7. The apparatus of claim 6 in which said surface forms a cam channel, and each said vane has a projecting member, said projecting members adapted to be guided by said channel.

8. A windmill apparatus comprising, a shaft rotatable about its axis, vanes connected to said shaft and rotatable therewith, each said vane having an open rectangular frame with long and short edges, each said vane having said long edges parallel to said shaft axis, each said vane being rotatable about an axis parallel to said shaft axis, each said vane having mounted on said frame a flexible sheet adapted to form a curved surface under wind pressure, and a cam member rotatably mounted on said shaft, said cam member having a tail means responsive to wind direction, said tail means being adapted to orient said cam member to wind direction, said cam member having a surface which is substantially planar, perpendicular to said shaft axis and said vane axes, and adjacent and parallel to said short edges of said vanes and comprises cover means at the end of the cylindrical volume defined by the rotating vanes for preventing wind spillage off the adjacent edges of the vane sheets, said surface defining a cam channel, each said vane having a projecting member adapted to be guided by said cam channel to control the orientation of said vanes about said vane axes that is related only to the position of a respective vane about said shaft as said vanes rotate with said shaft about said shaft axis, so that said vanes go through reaching, running, beating, jibing and tacking modes, whereby said apparatus will develop torque as the vanes move up wind as well as down and consequently each vane is effective throughout most of a rotation cycle, and prevents spilling of air flow over the top and bottom edges of the vanes and said cam member receives impulses from the jibe mode of said vanes to help position said cam member for the apparent wind acting on said vanes.

* * * * *